(12) United States Patent
Orehek

(10) Patent No.: US 10,717,490 B1
(45) Date of Patent: Jul. 21, 2020

(54) CUSHIONED TRACTION PADS

(71) Applicant: Paul Orehek, Pebble Beach, CA (US)

(72) Inventor: Paul Orehek, Pebble Beach, CA (US)

( * ) Notice: Subject to any disclaimer, the term of this patent is extended or adjusted under 35 U.S.C. 154(b) by 0 days.

(21) Appl. No.: 16/375,680

(22) Filed: Apr. 4, 2019

(51) Int. Cl.
*A63C 5/08* (2006.01)
*B62K 11/00* (2006.01)
*A47G 27/02* (2006.01)
*B62D 51/02* (2006.01)
*B62D 37/00* (2006.01)

(52) U.S. Cl.
CPC ........ *B62K 11/007* (2016.11); *A47G 27/0231* (2013.01); *B62D 37/00* (2013.01); *B62D 51/02* (2013.01)

(58) Field of Classification Search
CPC ...... B62K 11/007; B62D 51/02; B62D 37/00; B63B 35/79; B63B 35/7906; B63B 35/7936; A63C 5/00; A63C 5/03; A63C 5/003; A63C 5/06; A63C 5/124; A63C 17/01; A63C 17/017
See application file for complete search history.

(56) References Cited

U.S. PATENT DOCUMENTS

| | | | | |
|---|---|---|---|---|
| 2,825,575 A | * | 3/1958 | Mickels | B62K 1/00 280/87.042 |
| 4,241,929 A | * | 12/1980 | Curry | B62B 15/00 280/14.27 |
| 5,308,271 A | * | 5/1994 | Foulke | B63B 35/7936 4/583 |
| 5,435,765 A | | 7/1995 | Fletcher | |
| 5,766,051 A | * | 6/1998 | Messer | A63C 5/00 441/65 |
| 6,435,529 B1 | * | 8/2002 | Stewart | B62K 3/002 188/19 |
| 6,767,264 B2 | | 7/2004 | Mercer | |
| 6,767,265 B2 | * | 7/2004 | Gamble | A43B 5/08 428/100 |
| 6,854,748 B2 | * | 2/2005 | Wimbish | A63C 17/017 280/14.21 |
| 7,316,597 B2 | | 1/2008 | Skedeleski | |
| 7,322,867 B2 | | 1/2008 | Blakely | |
| 9,045,201 B1 | | 6/2015 | Kuzmarskis | |
| 9,101,817 B2 | * | 8/2015 | Doerksen | A63C 17/12 |
| D746,928 S | | 1/2016 | Doerksen | |

(Continued)

FOREIGN PATENT DOCUMENTS

EP 3431554 A1 1/2019

*Primary Examiner* — James M Dolak
(74) *Attorney, Agent, or Firm* — JRG Attorneys at Law

(57) ABSTRACT

Method and apparatus directed to cushioned traction pads for self-balancing vehicles. The method and apparatus is comprised of a front cushioned traction pad that has a top surface and a bottom surface; attaching the bottom surface of the front cushioned traction pad to a first deck portion disposed at a first end of a frame, the top surface of the front cushioned traction pad configured to receive a left or right foot of a rider; selecting a rear cushioned traction pad that has a top surface and a bottom surface. The top surface of the rear cushioned traction pad further has a rear kicktail extending integrally upwardly and rearwardly. The method and apparatus further include attaching the bottom surface of the rear cushioned traction pad to a second deck portion disposed at a second end of the frame for receiving the left or right foot of a rider.

9 Claims, 14 Drawing Sheets

(56) References Cited

U.S. PATENT DOCUMENTS

| | | | |
|---|---|---|---|
| 9,400,505 B2* | 7/2016 | Doerksen | A63C 17/12 |
| D769,997 S | 10/2016 | Doerksen | |
| 9,597,580 B2 | 3/2017 | Doerksen | |
| 9,675,868 B2* | 6/2017 | Willis | A63C 17/017 |
| 9,802,109 B2* | 10/2017 | Doerksen | A63C 17/12 |
| 9,968,841 B2* | 5/2018 | Doerksen | A63C 17/12 |
| D821,517 S | 6/2018 | Doerksen | |
| 10,144,478 B2* | 12/2018 | Ying | B62K 11/007 |
| D843,532 S | 3/2019 | Doerksen | |
| 10,252,724 B2* | 4/2019 | Edney | B60W 40/13 |
| 10,456,658 B1* | 10/2019 | Doerksen | B60L 3/0007 |
| 10,532,787 B2* | 1/2020 | Park | B62J 1/28 |
| 2005/0106961 A1* | 5/2005 | Larkin | B63B 35/7933 |
| | | | 441/74 |
| 2009/0115149 A1* | 5/2009 | Wallis | B60N 2/002 |
| | | | 280/6.159 |

\* cited by examiner

Removed the board since it was not previously identified or needed

7

Identified the coupling device

180

Identified the rear kicktail

CUSHIONED TRACTION PADS

TECHNICAL FIELD

The present invention relates generally to traction pads, more particularly, to cushioned traction pads utilized for self-balancing vehicles that have at least one wheel for movement.

BACKGROUND OF THE INVENTION

Self-balancing vehicles such as electric skateboards that have at least one wheel for travel/movement generally include first and second deck portions that are each configured to receive a left or right foot of a rider. The deck portions come with a flat grip tape 13 that is coarse for reducing rider slippage, and the deck portions are not cushioned for the feet of riders.

When in use, a user may want to ride the self-balancing vehicle barefoot or with socks if riding near a beach, park or a trail. The flat grip tape 13 makes it very uncomfortable for users to ride the self-balancing vehicle barefoot or with just socks because of the coarse surface. Further, the deck portion is comprised of a hard surface which also makes it very uncomfortable for a user to ride the vehicle barefoot for prolonged periods of time, with socks or even with just shoes.

Another problem with self-balancing vehicles such as the ONEWHEEL™ is that the stock grip tape 13 loses its traction and becomes slippery when debris is kicked up and thrown on top of the tape surface especially when riding off road. This problem often leads to the feet of users sliding on the foot pads and ultimately the problem of users losing control when riding the vehicle.

In light of the shortcomings in the prior art, there is definitely a need for an improved way of providing a user with a comfortable gripping foot surface when riding a self-balancing vehicle.

SUMMARY OF THE INVENTION

The present invention relates to an improved way of providing a comfortable gripping/traction surface for the riders of self-balancing electric vehicles.

The present invention further relates to an improved gripping device that provides both sufficient traction to reduce rider slippage and cushioned features for user comfort.

Another aspect of the present invention is to provide cushioned traction pads that are lightweight for the users of self-balancing electric vehicles.

An additional aspect of the present invention is to provide cushioned traction pads that have protuberances for reducing rider slippage. The shape of the protuberances can be circular, triangular, square, pentagonal, hexagonal, diamond or combinations thereof.

A further aspect of the present invention is to provide front and rear traction pads that are cushioned and that include a sufficient gripping element disposed on the top portion of the traction pads for the rider's feet.

Another feature of the present invention is to provide traction pads that have a rear kicktail with beveled corners for further rider support. In other embodiments, the present invention provides sidekicks on the front traction pads for cradling and supporting the feet of riders.

An additional feature of the present invention is to provide front and rear cushioned traction pads that are comprised of lightweight ethylene-vinyl acetate foam (EVA foam).

A further feature of the present invention is to provide cushioned traction pads that come in a variety of colors and styles to fit the esthetic taste of individual riders.

For a better understanding of the present invention, its functional advantages and the specific objects attained by its uses, reference should be made to the accompanying drawings, claims and descriptive matter in which there are illustrated embodiments of the invention.

DETAILED DESCRIPTION

Introduction

The following detailed description is of the best currently contemplated modes of carrying out various embodiments of the invention in which said embodiments can be carried out independently and/or in combination. The description is not to be taken in a limiting sense but is made for at least the purpose of illustrating the general principles of the invention, since the scope of the invention is best defined by the appended claims.

In one embodiment, a pair of cushioned traction pads for a self-balancing vehicle is comprised of front and rear cushioned traction pads, each of the traction pads include a top surface and a bottom surface. The bottom surfaces of the front and rear cushioned traction pads are configured to be attached to first and second deck portions respectively. The top surfaces of the traction pads are configured to receive the left or right foot of a rider. The top surface of the rear cushioned traction pad also includes a rear kicktail extending integrally upwardly and rearwardly. In various embodiments, the front traction pad includes sidekicks for cradling the feet of riders.

In another embodiment of the present invention, a method provides for cushioned traction pads for self-balancing vehicles such as a ONEWHEEL™ vehicle. The method includes the steps of selecting front and rear cushioned traction pads; attaching the bottom surfaces of the cushioned traction pads to first and second deck portions disposed on a frame; attaching the bottom surfaces of the cushioned traction pads to the deck portion; and providing cushioned traction pads configured to receive the left or right foot of riders.

Detailed Description

It should be understood that the foregoing relates to various embodiments of the present invention which can be carried out independently and/or in combination and that modifications may be made without departing from the spirit and scope of the invention. It should be further understood that the present invention is not limited to the designs mentioned in this application and the equivalent designs in this description, but it is also intended to cover other equivalents now known to those skilled in the art, or those equivalents which may become known to those skilled in the art in the future.

Figure 1A:
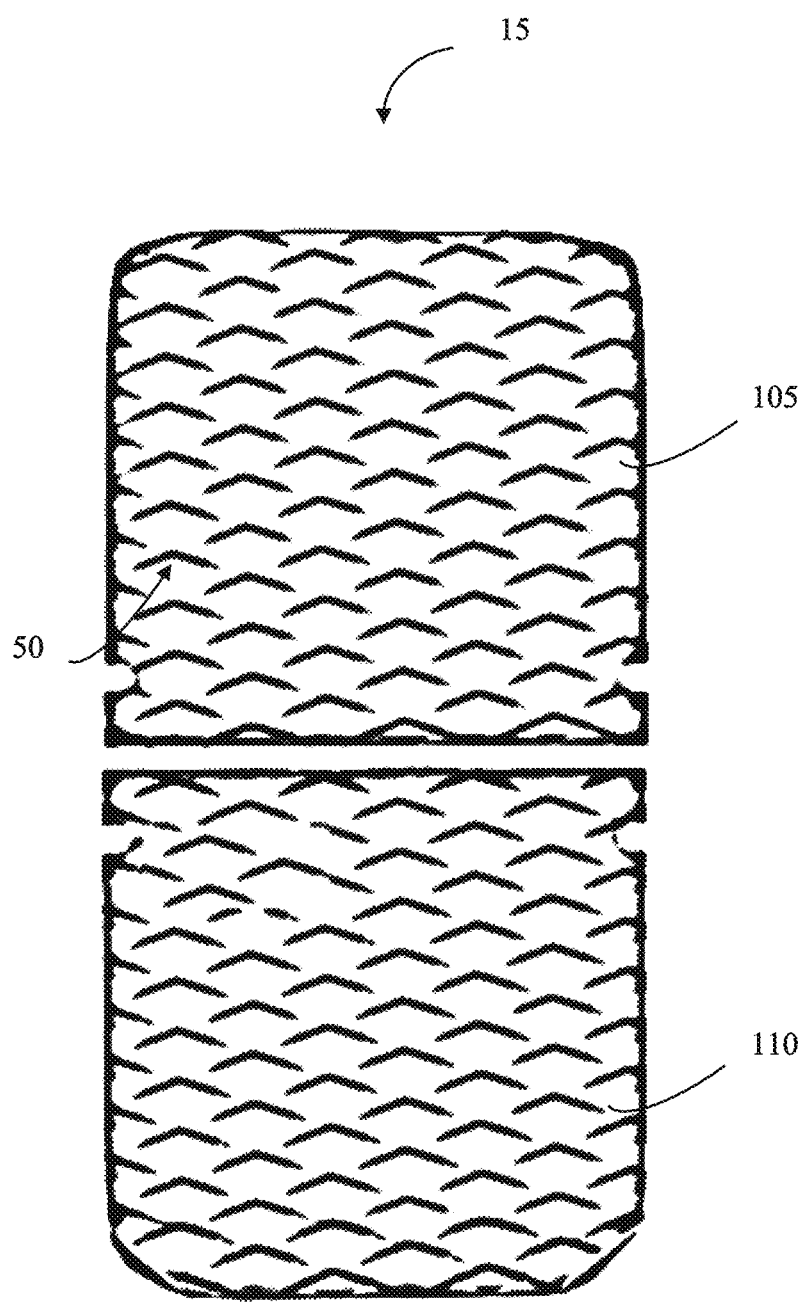
FIG. 1A shows front and rear cushioned traction pads.
Figure 6A:
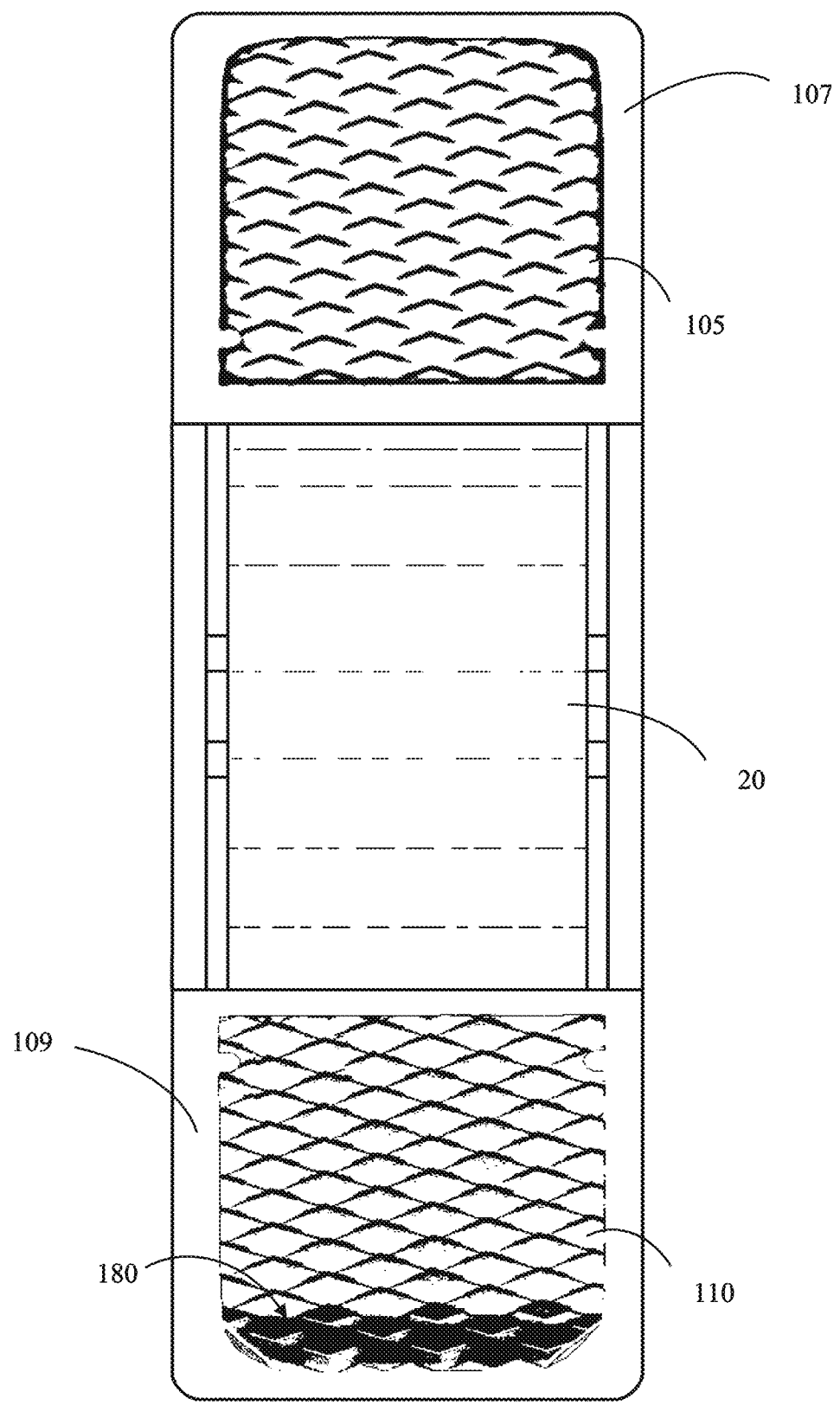
FIG. 6A represents a top view of a self-balancing vehicle having front and rear cushioned traction pads.
Figure 6B:
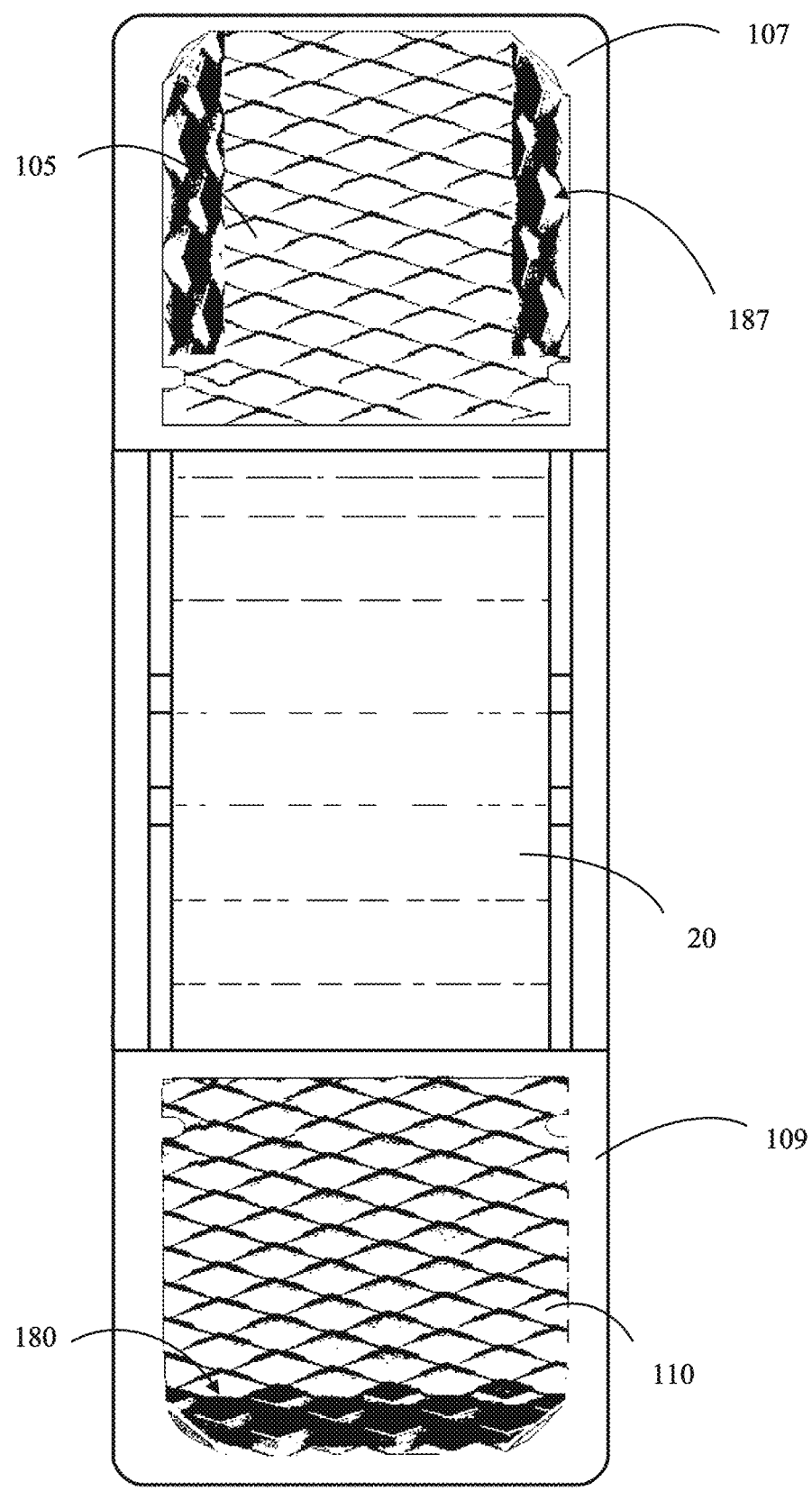
FIG. 6B represents another top view of a self-balancing vehicle.
Figure 6C:
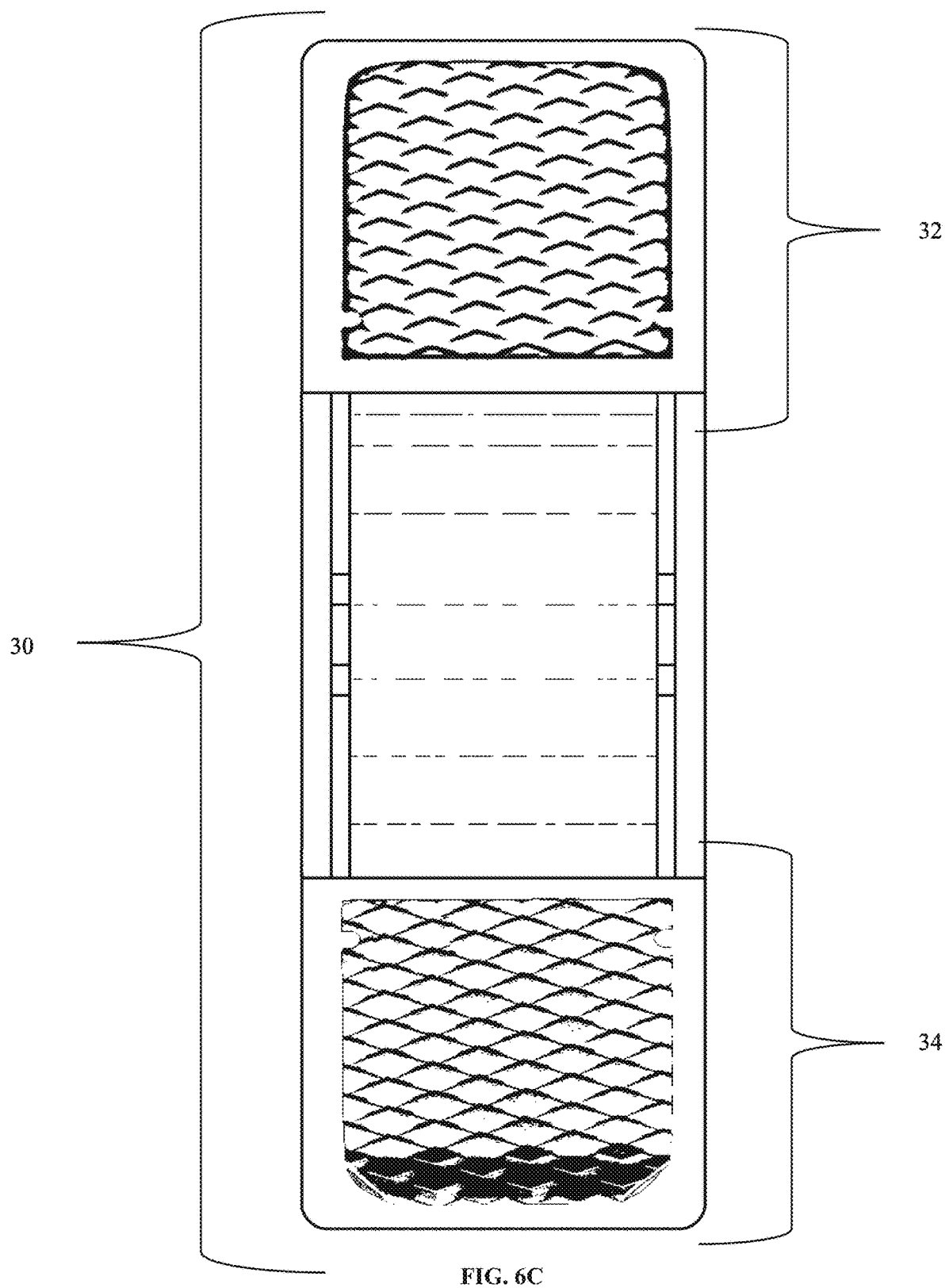
FIG. 6C represents a further top view of a self-balancing vehicle showing the frame of said vehicle.

With reference to FIG. 1A, one embodiment is depicted showing a pair of cushioned traction pads 15 (rectangular shaped having a width and length) for self-balancing vehicles 10 such as a ONEWHEEL™. The cushioned traction pads 15 include a front cushioned traction pad 105 having a top surface and a bottom surface 55 that includes an adhesive such as double coated tissue tape (See FIGS. 1D-1E). The bottom surface 55 of the front cushioned traction pad 105 is configured to be attached to a first deck portion 107 disposed at a first end 32 of a frame 30 as shown in FIGS. 6A-6C. The top surface of the front cushioned traction pad 105 is configured to receive a left or right foot of a rider.

Referring still to FIG. 1A, a rear cushioned traction pad 110 includes a top surface and a bottom surface 55. The bottom surface 55 of the rear cushioned traction pad 110 is configured to be attached to a second deck portion 109 disposed at a second end 34 of the frame 30 as shown in FIGS. 1D-1E and 6A-6C. The top surface of the rear cushioned traction pad 110 is configured to receive the left or right foot of the rider. Further, the top surface of the rear cushioned traction pad 110 advantageously includes a rear kicktail 180 extending integrally upwardly and rearwardly as shown in FIGS. 2A, 4, 5A-5B, 6A, 6B and 6C.

In various embodiments, the bottom surface of the friction pads includes an adhesive for adhering the bottom surfaces to the deck portions 107/109. The adhesive can be comprised of 3M double coated tissue tape (3M 9080A).

Figure 1B:
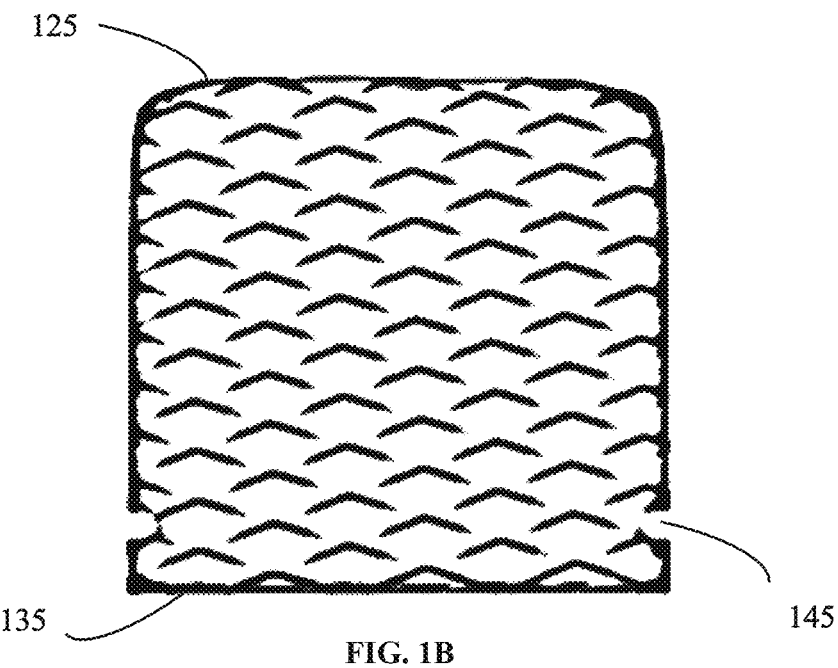
FIG. 1B shows a front cushioned traction pad.

As shown in FIG. 1B, the front cushioned traction pad 105 includes a first front end 125 and a first rear end 135. In one embodiment, a pair of notches 175 are disposed substantially at left and right sides of the first rear end 135 for allowing access to a coupling device 7 such as a screw or fastener for fastening the deck to the frame (See also FIGS. 4, 5A-5B).

Figure 1C:
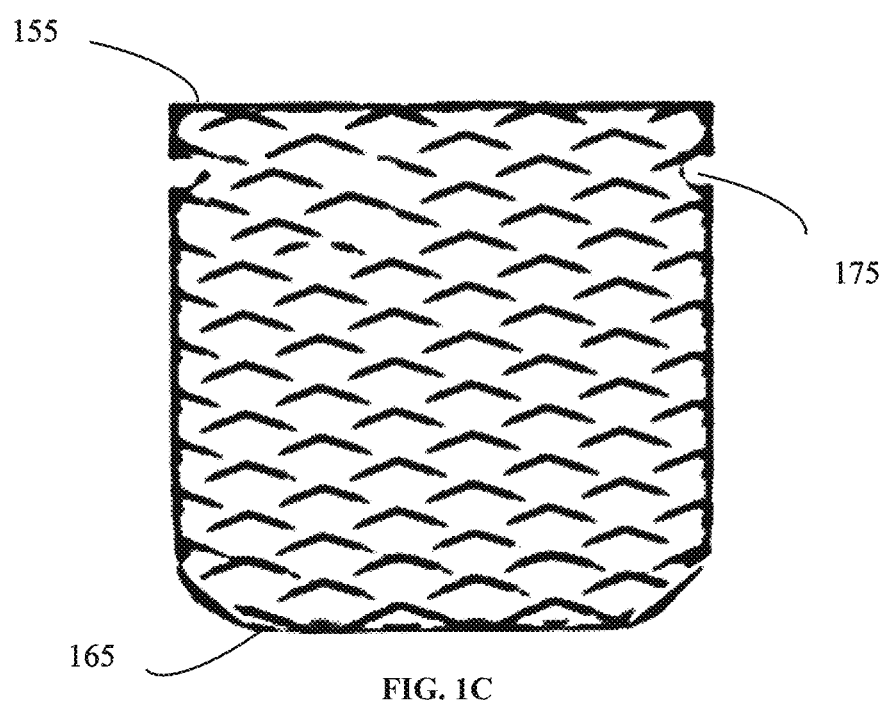
FIG. 1C shows a rear cushioned traction pad.
Figure 1D:
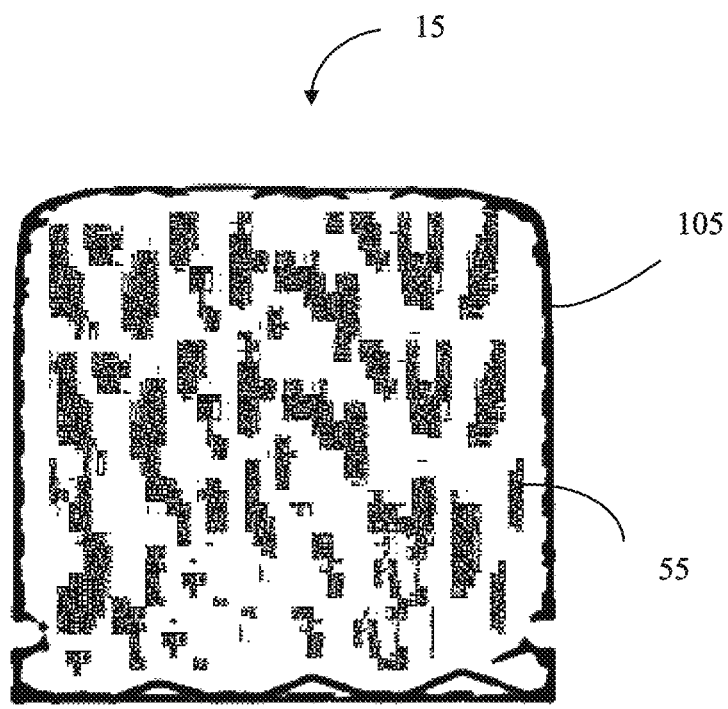
FIGS. 1D-1E show the bottom surface of the front and rear cushioned traction pads.
Figure 1E:
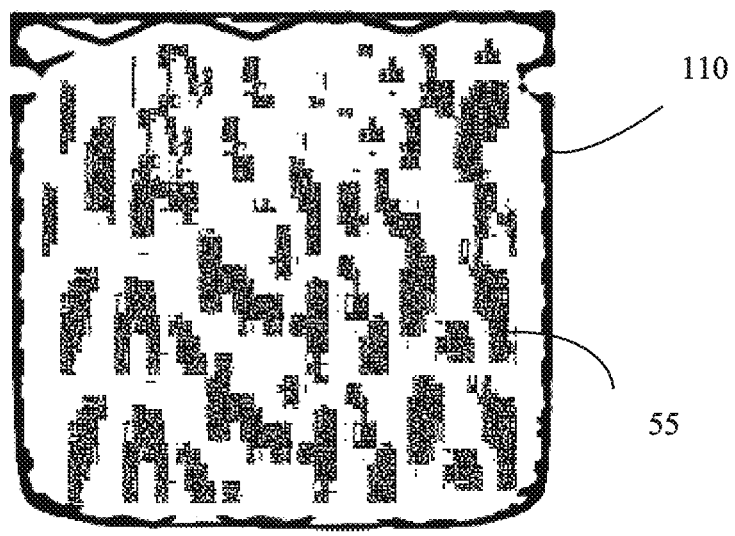

As shown in FIG. 1C, the rear cushioned traction pad 110 includes a second front end 155 and a second rear end 165. In various embodiments, a pair of notches 175 are disposed substantially at left and right sides of the second front end 155 for allowing access to a coupling device 7 such as screw or fastener for fastening the deck to the frame (See also FIGS. 4, 5A and 5B).

Figure 4:
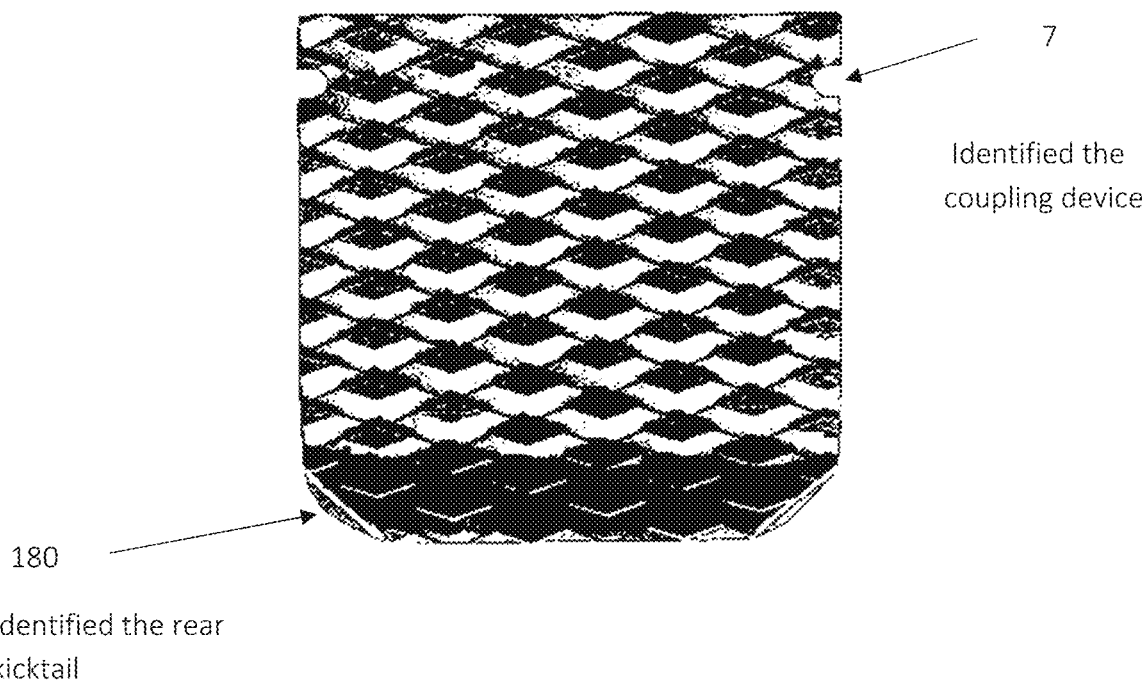
FIG. 4 represents another view of a rear cushioned traction pad having a kicktail.
Figure 5A:
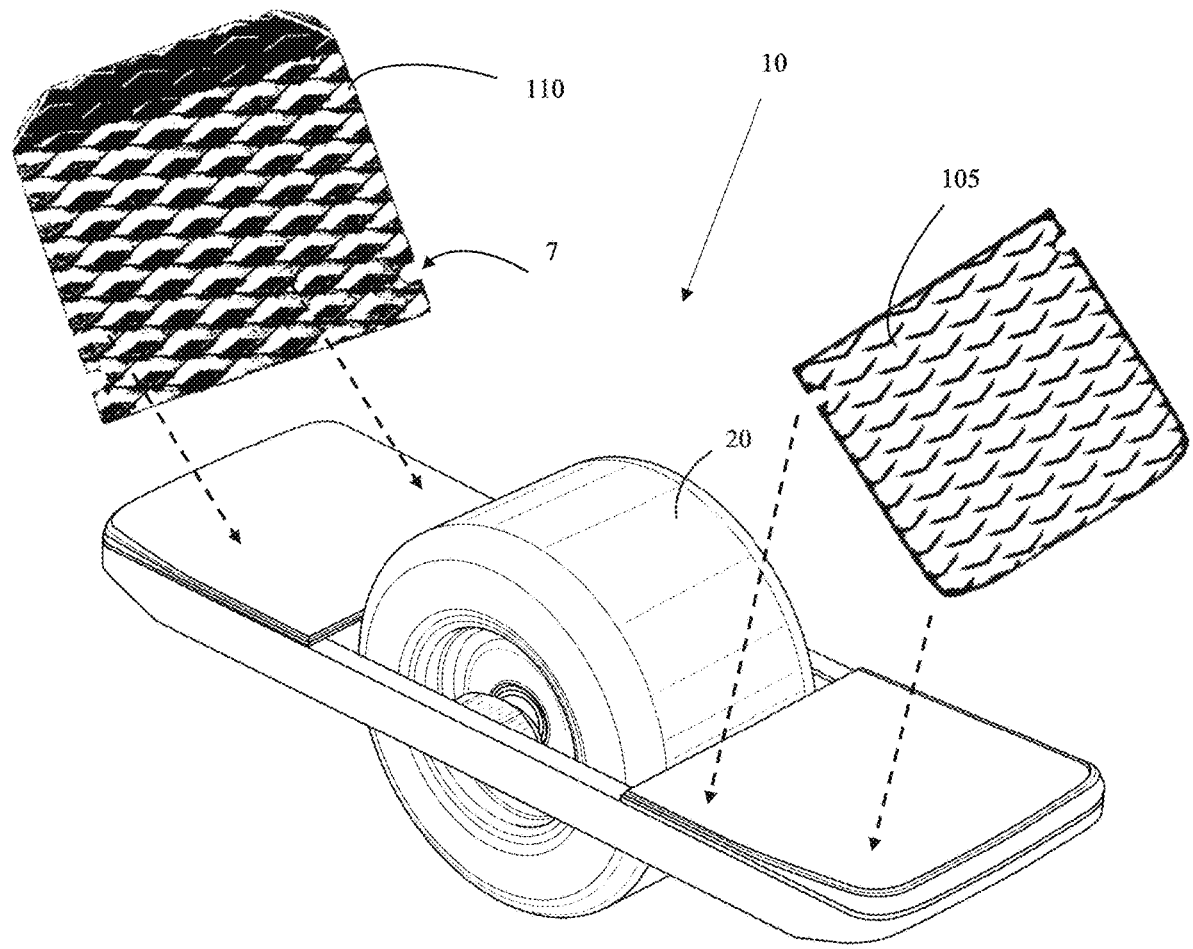
FIG. 5A represents a self-balancing vehicle.
Figure 5B:
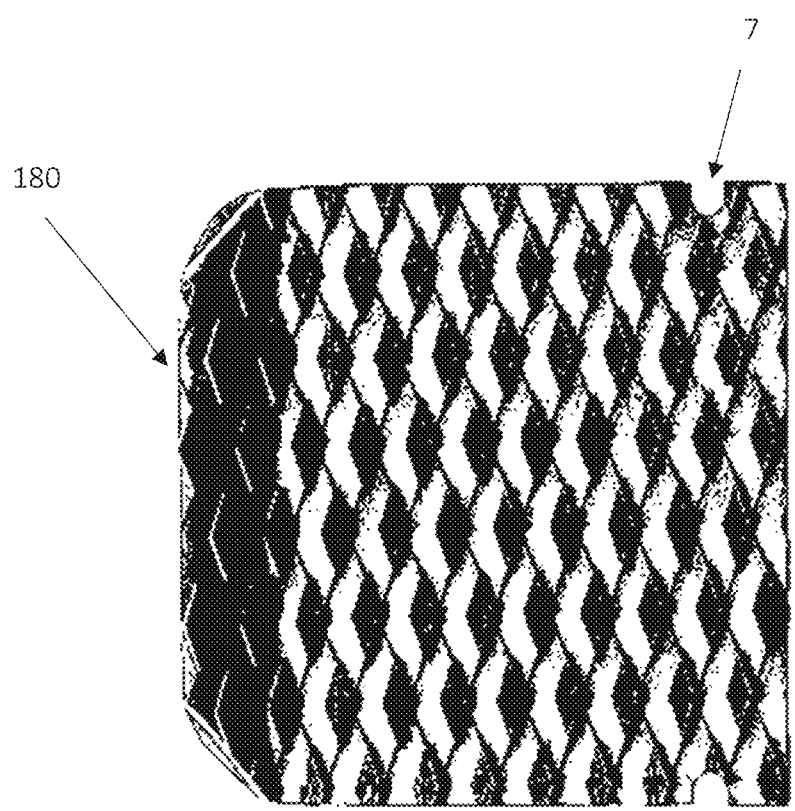
FIG. 5B shows an exploded view of the rear cushioned traction pad, including a view of a coupling device.

In various embodiments, the top surfaces of the front and rear cushioned traction pads 105/110 include artistic design content and writings thereon as shown in FIGS. 4, 5A and 5B.

Figure 2A:
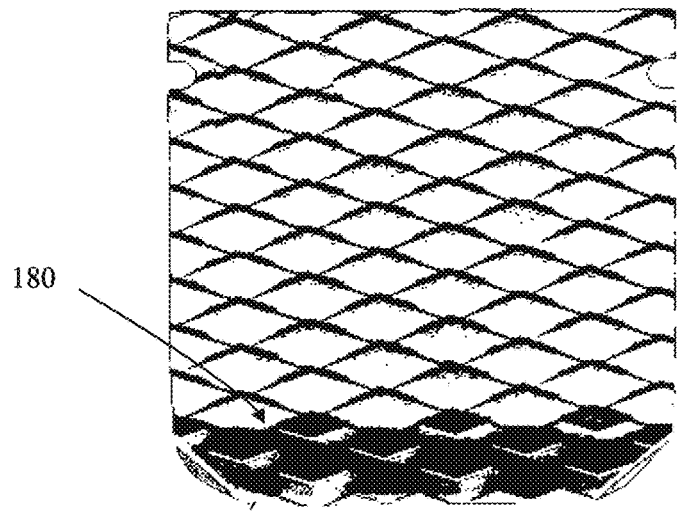
FIG. 2A depicts a rear cushioned traction pad having a kicktail.
Figure 2B:
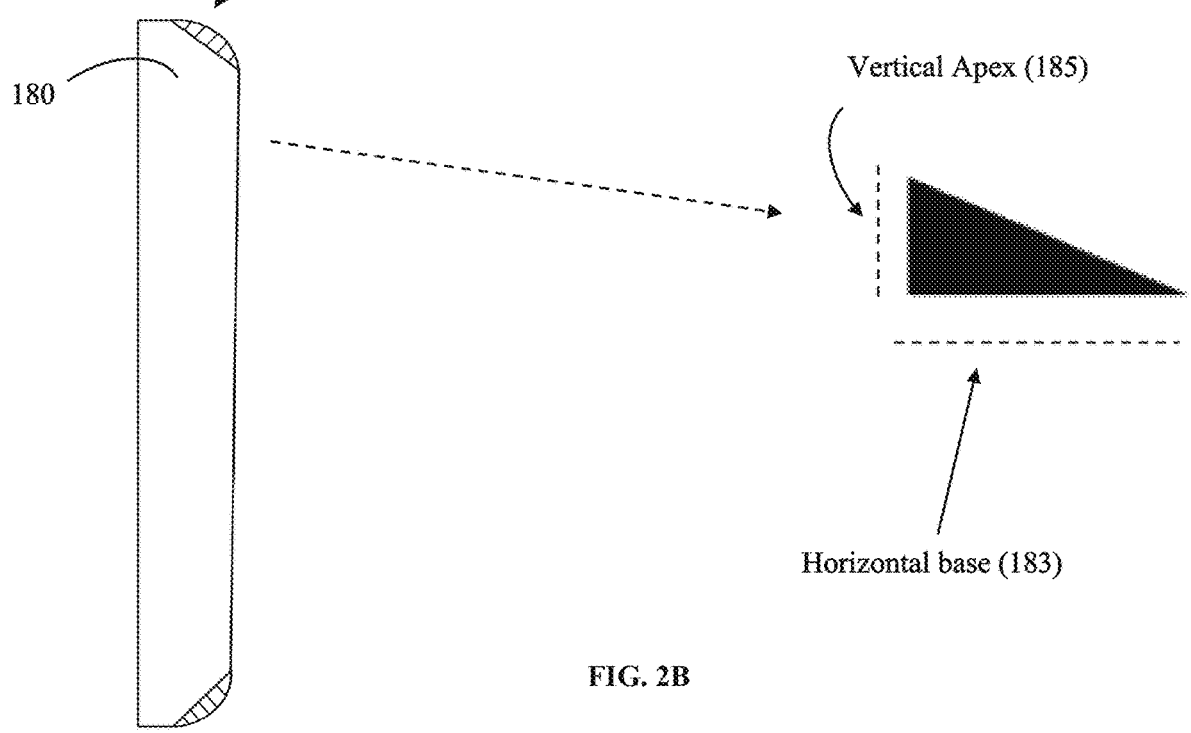
FIG. 2B shows the horizontal base and vertical apex for the kicktail.

Referring to FIGS. 2A-2B, the kicktail 180 (tail) includes a horizontal base 183 and a vertical apex 185. In various embodiments, the length of the horizontal base 183 is in the range of 20 mm to 30 mm, and the height of the vertical apex 185 is in the range of 15 mm to 25 mm. The kicktail will help riders to better maneuver self-balancing vehicles that have at least one wheel 20.

In various embodiments, riders can preselect the length of the horizontal base 188, and the height of the vertical apex 189 of the kicktail depending on their riding needs. For instance, it will be advantageous to allow riders to preselect the type of kicktail they desire because they may want to perform tricks on ONEWHEEL™ vehicles or compete against other riders.

Figure 3A:
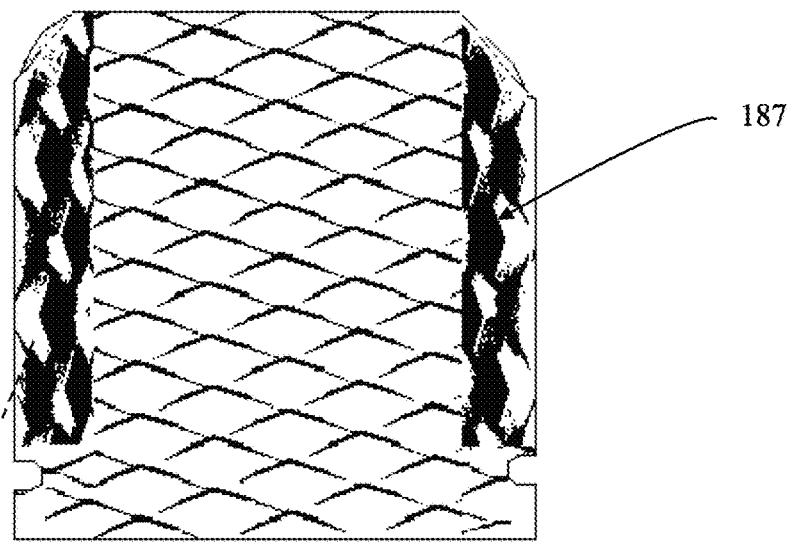
FIG. 3A depicts a front cushioned traction pad having a sidekick.
Figure 3B:
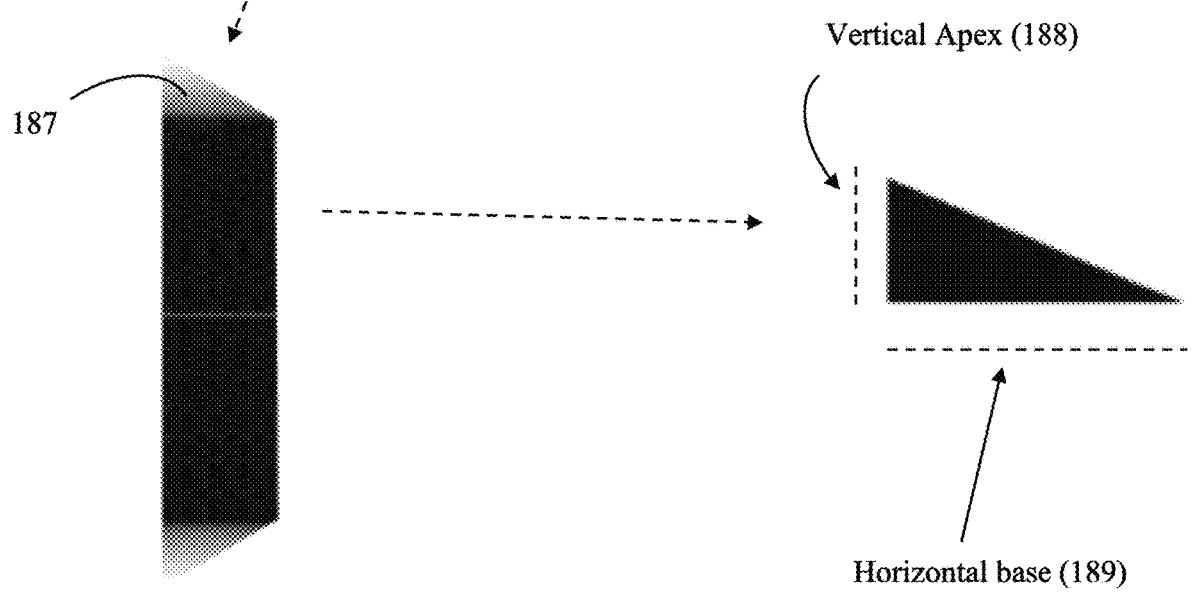
FIG. 3B shows the horizontal base and vertical apex for the sidekick.

In various embodiments, the front cushioned traction pad 105 can include sidekicks (See FIGS. 3A-3B). For this embodiment, riders can preselect the length of the horizontal base 188, and the height of the vertical apex 189 for the sidekicks depending on their riding needs.

Referring to FIGS. 3A-3B, a sidekick 187 includes a horizontal base 188 and a vertical apex 189. The length of the horizontal base 188, and the height of the vertical apex 189 can be preselected by riders depending on their riding needs. The sidekick will help to cradle the front foot of the rider and allow for better riding performance.

In various embodiments, the length of the horizontal base 188 is in the range of 25 mm to 50 mm, and the height of the vertical apex 189 is in the range of 5 mm to 20 mm.

Optionally, the rear traction pad 110 can also include sidekicks. The sidekicks will help to cradle the rear foot of the rider and allow for better riding performance.

In various embodiments, the self-balancing vehicle is an electric/electronic vehicle or it's an electric skateboard having at least one wheel 20 as shown in FIGS. 5A and 6. In other embodiments, the self-balancing vehicle is a one wheeled 20 vehicle.

Figure 8:
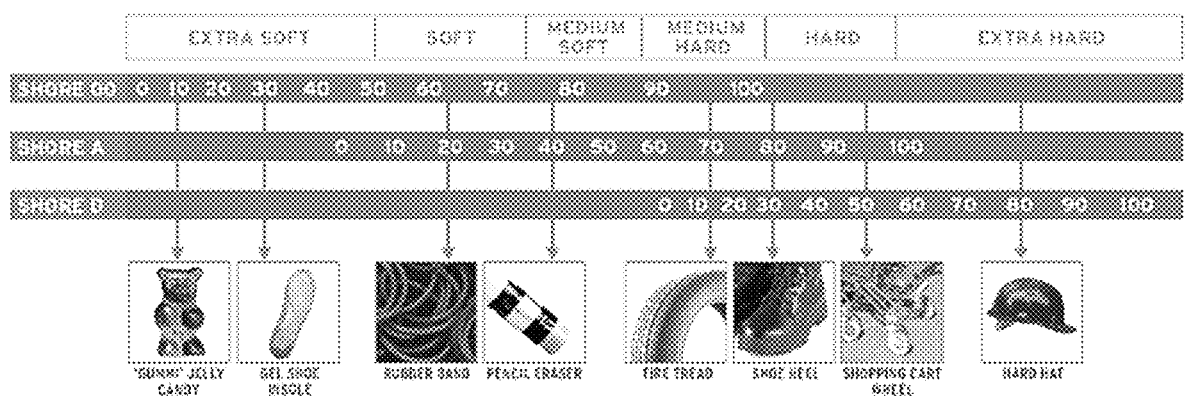
FIG. 8 represents a diagram directed to a shore hardness scale for the friction pads.

In further embodiments, the front and rear cushioned traction pads are comprised of ethylene-vinyl acetate foam (EVA foam). The shore hardness of the EVA foam for the present invention is in the range of 55-65 (Shore 00 scale) as illustrated in FIG. 8.

The shore harness range of 55-65 is important because it allows the deck portions of the self-balancing vehicle to be adequately cushioned for prolonged riding with or without shoes. Importantly, this shore harness range allows riders to ride barefoot especially when riding near a beach, park or trail.

In another embodiment of the present invention, the top surfaces of the front and rear cushioned traction pads 15 include a plurality of protuberances 50 for reducing the rider's slippage. The shape of the protuberances can be circular, triangular, square, pentagonal, hexagonal, diamond or combinations thereof (See also FIGS. 4, 5A and 5B).

Figure 5C:
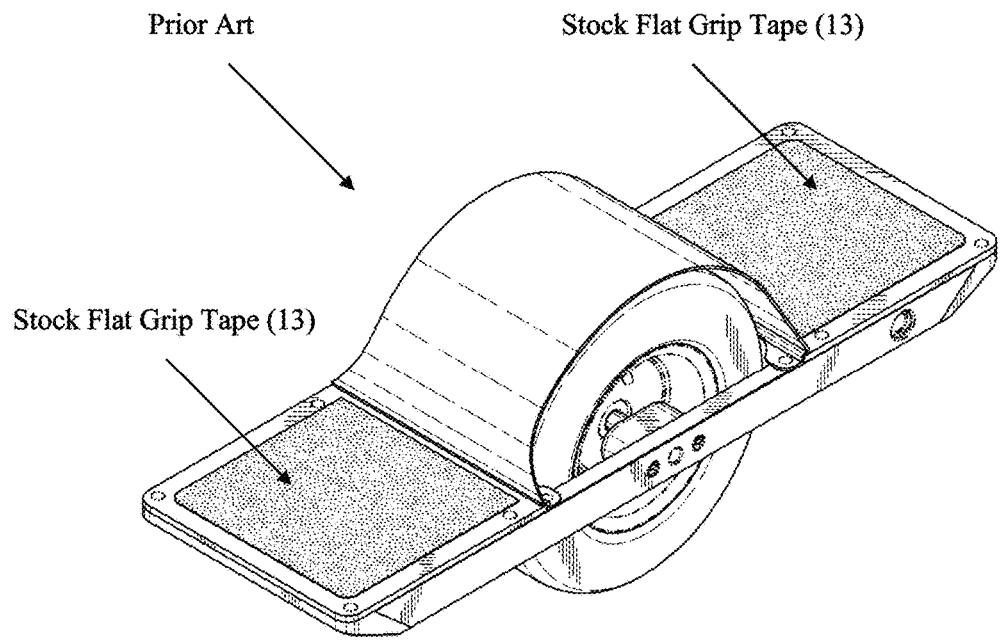
FIG. 5C-D shows the prior art.
Figure 5D:
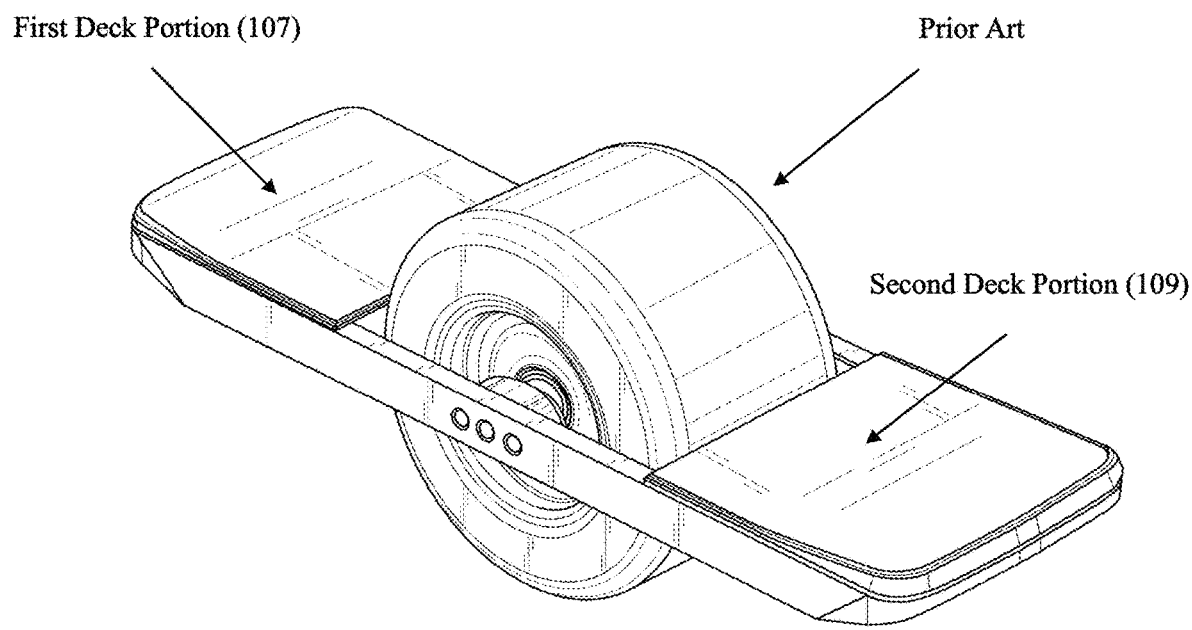

The top surfaces of the friction pads 105/110 have a distinct advantage over traditional stock flat grip tape 13 (See FIG. 5C). For example, the top surface of the cushioned traction pads 105/100 are easier to clean than the flat grip tape 13 since dirt or debris gets embedded into the grainy surface of the flat grip tape. Additionally, a rider can simply wipe the surface of the cushioned friction pads 105/110 clean with their hands or with cloth or a towel.

Figure 7:
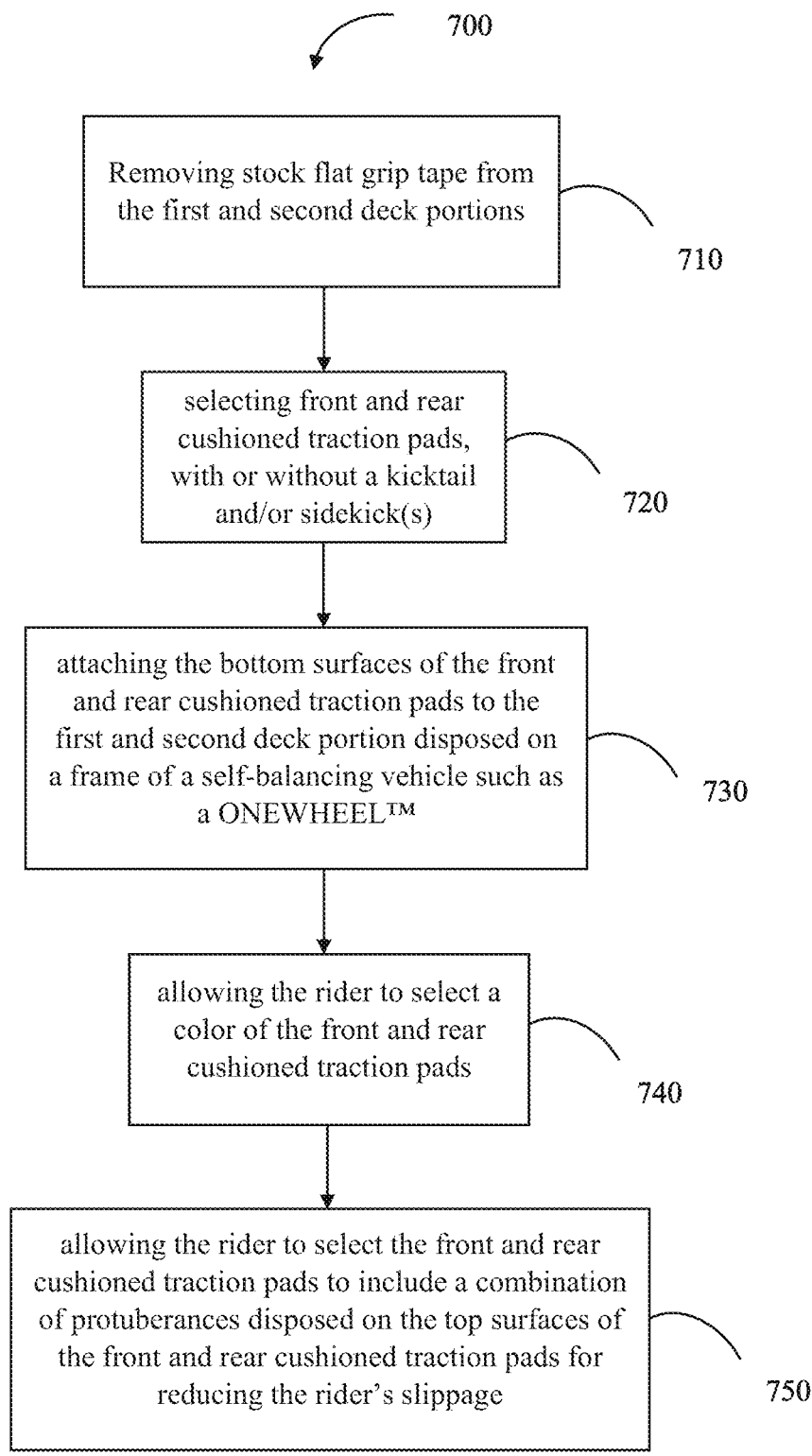
FIG. 7 represents an execution diagram directed to the method of providing cushioned traction pads for self-balancing vehicles.

Referring to FIG. 7, execution diagram 700 shows the process for providing cushioned traction pads for self-balancing vehicles. Starting at block 710, the method includes the step of removing the stock flat grip tape 13 from the first and second deck portions; at 720, selecting a front cushioned traction pad, the front cushioned traction pad having a top surface and a bottom surface; and block 720 includes the step of selecting a rear cushioned traction pad, the rear cushioned traction pad having a top surface and a bottom surface. The top surface of the rear cushioned traction pad includes a rear kicktail extending integrally upwardly and rearwardly.

Referring still to FIG. 7, block 730, includes the step of attaching the bottom surface of the front cushioned traction pad to a first deck portion disposed at a first end of a frame, the top surface of the front cushioned traction pad configured to receive a left or right foot of a rider; and block 730 also includes the step of attaching the bottom surface of the rear cushioned traction pad to a second deck portion disposed at a second end of the frame. The top surface of the rear cushioned traction pad configured to receive the left or right foot of the rider.

Referring still to FIG. 7, block 740, includes the step of allowing the rider to advantageously select a color of the front and rear cushioned traction pads; and block 750 is comprised of the step of allowing the rider to select the front and rear cushioned traction pads to include a combination of protuberances disposed on the top surfaces of the front and rear cushioned traction pads for reducing the rider's slippage.

In various embodiments, the top surfaces of the front and rear cushioned traction pads 105/110 include a plurality of beneficial protuberances. The shape of the protuberances can be circular, triangular, square, pentagonal, hexagonal, diamond or combinations thereof for helping to reduce the rider's slippage.

In other embodiments, the front and rear cushioned traction pads 105/110 are advantageously comprised of ethylene-vinyl acetate foam (EVA foam). The shore hardness of the EVA foam will be in the range of 55-65 (Shore 00 scale). The shore harness range of 55-65 is an important feature because it allows the deck portions of the self-balancing vehicles to be adequately cushioned for prolonged riding with or without shoes. Importantly, this shore harness range allows riders to ride barefoot especially when riding near a beach, park or trail.

INDUSTRIAL APPLICABILITY

The present invention pertains to cushioned traction pads for self-balancing vehicles having at least one wheel, which may be of value or importance to various industries, such as the skateboard, and the electronic/electrical transport industry.

What is claimed is:

1. A method of providing at least one cushioned traction pad for a self-balancing vehicle, said method comprising:
providing a front cushioned traction pad to a user, the front cushioned traction pad having a top surface and a bottom surface, the bottom surface of the front cushioned traction pad is coupled to a first deck portion disposed at a first end of a frame, the top surface of the front cushioned traction pad receives a left or right foot of the user and wherein the front cushioned traction pad includes a frontal end and a posterior end;
providing a rear cushioned traction pad to the user, the rear cushioned traction pad having a top surface and a bottom surface, the bottom surface of the rear cushioned traction pad is coupled to a second deck portion disposed at a second end of the frame, the top surface of the rear cushioned traction pad receives the left or right foot of the user and wherein the rear cushioned traction pad includes a frontal end and a posterior end;
providing the front and rear cushioned traction pads to the user having a combination of protuberances disposed on the top surfaces thereon for reducing the user's slippage while riding the self-balancing vehicle, the self-balancing vehicle includes a single wheel substantially coupled to a middle section of the frame; and
the front cushioned traction pad is disposed fore of the single wheel and the rear cushioned traction pad is disposed aft of the single wheel, wherein a first space is disposed between the single wheel and the posterior end of the front cushioned traction pad, and wherein a second space is disposed between the single wheel and the posterior end of the rear cushioned traction pad, thereby enabling the single wheel to rotate when in use;
wherein the top surface of the rear cushioned traction pad includes a rear kicktail extending integrally upwardly and rearwardly, wherein the kicktail further includes a horizontal base and a vertical apex, the length of the horizontal base is in the range of 20 mm to 30 mm, and the height of the vertical apex is in the range of 15 mm to 25 mm.

2. The method of claim 1, further including the step of providing the front and rear cushioned traction pads comprised of ethylene-vinyl acetate foam (EVA foam) and having a shore hardness in the range of 55 to 65, whereby the shore hardness range allows the user to ride the self-balancing vehicle with or without shoes for a prolonged period of time.

3. The method of claim 1, wherein the shape of the protuberances is circular, triangular, square, pentagonal, hexagonal, or diamond.

4. The method of claim 1, wherein the front and rear cushioned traction pads are comprised of ethylene-vinyl acetate foam (EVA foam), and wherein a shore hardness of the EVA foam is in the range of 55 to 65.

5. The method of claim 1, wherein the front and rear cushioned traction pads includes a plurality of notches for allowing access to at least one coupling device.

6. The method of claim 1, wherein the top surface of the cushioned traction pads further include sidekicks, each of the sidekicks include a horizontal base and a vertical apex, wherein each of the sidekicks extend integrally upwardly on each side of the top surface, wherein the length of the horizontal base is in the range of 25 mm to 50 mm, and the height of the vertical apex is in the range of 5 mm to 20 mm.

7. The method of claim 1, wherein the the rear kicktail includes beveled corners, thereby providing further riding support for the user.

8. The method of claim 1, wherein the bottom surfaces of the front and rear cushioned traction pads include an adhesive disposed thereon, wherein the adhesive is comprised of double coated tissue tape, thereby enabling the cushioned traction pads to adhere to bottom surfaces of the first and second deck portions.

9. The method of claim 1, wherein the shape of the front and rear cushioned traction pads being rectangular, wherein a length of the pads being longer than a width of the pads.

* * * * *